United States Patent [19]

Fischer et al.

[11] Patent Number: 5,739,219

[45] Date of Patent: Apr. 14, 1998

[54] CONTINUOUS PREPARATION OF POLYMERS

[75] Inventors: Wolfgang Fischer, Ludwigshafen; Michael Baumgärtel, Frankenthal, both of Germany

[73] Assignee: BASF Aktiengesellschaft, Ludwigshafen, Germany

[21] Appl. No.: 673,966

[22] Filed: Jul. 1, 1996

[30] Foreign Application Priority Data

Jul. 3, 1995 [DE] Germany .......... 195 24 180.0

[51] Int. Cl.[6] .................................................. C08F 2/06
[52] U.S. Cl. .................. 526/64; 526/68; 526/342; 526/347
[58] Field of Search .................. 526/64, 68, 342, 526/347

[56] References Cited

U.S. PATENT DOCUMENTS

| | | | |
|---|---|---|---|
| 4,056,671 | 11/1977 | Alberts et al. | 526/342 |
| 4,060,680 | 11/1977 | Hendy | 526/201 |
| 4,061,848 | 12/1977 | Sistig et al. | 526/61 |
| 4,068,064 | 1/1978 | Platt et al. | 526/194 |
| 4,141,934 | 2/1979 | Wingler et al. | 526/65 |
| 4,501,865 | 2/1985 | Koenig et al. | 526/71 |
| 5,106,781 | 4/1992 | Penning De Vries | 437/192 |
| 5,231,052 | 7/1993 | Lu et al. | 437/190 |

FOREIGN PATENT DOCUMENTS

| | | |
|---|---|---|
| 23 61 743 | 6/1975 | Germany . |
| 25 04 659 | 8/1976 | Germany . |
| 25 13 253 | 10/1976 | Germany . |
| 26 14 674 | 10/1976 | Germany . |
| 26 19 669 | 11/1976 | Germany . |
| 25 40 517 | 3/1977 | Germany . |
| 32 37 076 | 4/1984 | Germany . |
| 34 30 247 | 2/1986 | Germany . |
| 273 265 | 11/1989 | Germany . |
| 294 429 | 10/1991 | Germany . |
| 294429 | 10/1991 | Germany . |

OTHER PUBLICATIONS

Ullmanns Encyklopadie der technischen Chemie, Band 19, pp. 107–161, 1980.
Ullmanns Encyklopadie, 4., Band 19, 1980, p. 107 ff.
Ullmann's Encyclopedia, vol. A 21, 1966, Fifth Ed.

Primary Examiner—Thomas R. Weber
Attorney, Agent, or Firm—Keil & Weinkauf

[57] ABSTRACT

In a process and an apparatus for the continuous preparation of polymers from reaction components, in particular of copolymers of styrene and acrylonitrile, by bulk or solution polymerization, the reaction components are passed through a recycle reactor which has at least one tube bundle reactor whose tubes are in thermal contact with a liquid heat-transfer medium and which is connected to at least one static mixing element.

16 Claims, 1 Drawing Sheet

CONTINUOUS PREPARATION OF POLYMERS

BACKGROUND OF THE INVENTION

1. Field of the Invention

The invention relates to a process and an apparatus for the continuous preparation of polymers from reaction components, in particular of copolymers of styrene and acrylonitrile, by bulk or solution polymerization.

2. Description of Related Art

Free-radical polymerization of acrylonitrile with vinylaromatic compounds such as styrene, α-methylstyrene, vinyltoluene and the like, where appropriate using flee-radical initiators, is known (DE 23 61 743, DE 25 13 253, DE 25 40 517, DE 26 14 674, DE 26 19 969). It is known to carry out polymerizations in a stirred vessel. In such cases, the heat of reaction can be removed either through the wall or by evaporative or reflux cooling (DE 34 30 247, DE 32 37 076, DE 25 04 659). However, this is possible in the case of the copolymerization of vinylaromatics and acrylonitrile by this process only when the conversions are not too high, and in the presence of relatively large mounts of inert solvents, because otherwise relatively high viscosities which cannot be dealt with occur. The conversion must also not be too high because when the conversions are higher in continuous stirred vessels the resulting products have broader molecular weight distributions (cf. Z. Tadmor, Ind. Eng. Chem. Fundam. 5 (1966) 336 and G. Gerrens, Polymerisationstechnik, Ullmanns Enzyklopädie der technischen Chemie, 4th edition, Verlag Chemie, Weinheim, 1980, 107 et seq.). Since, as a rule, the unreacted monomers and the solvent are returned to the reactor for economic reasons a low conversion is disadvantageous in such cases, especially since it also leads to relatively low space-time yields. The stirred vessels developed to improve the removal of heat and to deal with highly viscous polymer solutions are technically very elaborate (DD 273 265, DD 294 429) and thus very costly.

It is an object of the present invention to develop a process and an apparatus for the preparation of polymers and copolymers in particular of vinylaromatics and acrylonitrile with a narrow molecular weight distribution in the presence of minimum amounts of solvent and with high conversion.

SUMMARY OF THE INVENTION

We have found that polymers and copolymers with a narrow molecular weight distribution are obtained in the presence of minimum amounts of solvent and with high conversion by passing the reaction components through a recycle reactor which has at least one tube bundle reactor whose tubes are charged with a liquid heat-transfer medium and which is connected to at least one static mixing element. The tube bundle reactor is preferably a shell and tube heat exchanger which consists of straight tubes. It is possible in principle to control relatively high viscosities in tubular reactors of this type. At the same time, these reactors can also have a large specific cooling area for removing the heat of reaction. The volume of the shell and tube heat exchanger is preferably at least 75% of the total volume of the arrangement.

DESCRIPTION OF PREFERRED EMBODIMENTS

It is preferable to use two tube bundle reactors and two static mixing elements, one of which is arranged between the feed mixture inlet and the downstream tube bundle reactor and the other is arranged between the two tube bundle reactors. The whole arrangement is connected as a circuit, and the reaction mass is circulated by a circuit pump. The feed mixture is conveyed into the circulation through a feed mixture inlet, and the reaction mass is passed through an outlet out of the reactor into a degassing extruder. A mixture of fresh monomers and volatile constituents which have been recycled from the degassing and condensed is fed into the reactor.

The process according to the invention for the preparation of polymers, especially thermoplastic copolymers, is explained in more detail hereinafter:

Said copolymers are composed of at least one vinylaromatic monomer a) and at least one monomer b) from the group of nitriles of (meth)acrylic acid and of esters of (meth)acrylic acid of alcohols with 1 to 8 carbon atoms, and maleic anhydride. Suitable and preferred vinylaromatic monomers are: styrene, α-methylstyrene and para-methylstyrene too. Preferred copolymers which may be mentioned are the binary copolymers of styrene and acrylonitrile, of α-methylstyrene and acrylonitrile, and the ternary polymers of α-methylstyrene, styrene and acrylonitrile.

In the solution polymerization it is possible additionally to feed in solvents in a proportion of from 1 to 25% by weight, preferably 2 to 18% by weight, and up to 5% by weight of water based on 100% by weight of the mixture of monomers a) and b). Suitable inert solvents are nonpolar solvents such as aromatic hydrocarbons with 6 to 12 carbon atoms, in particular benzene, toluene, ethyltoluene or ethylbenzene. Ethylbenzene is particularly preferably used.

The process according to the invention can be carried out either thermally or using conventional initiators, eg. organic peroxides or organic azo compounds which are known to the skilled worker. These initiators are used in the concentrations familiar to the skilled worker, ie. in the range from 0.001 to 0.5% by weight, in each case based on the total of monomers a) and b). The skilled worker is aware of the form in which these initiators (as solution in monomers or in the solvent) can be metered continuously into the reactor in which the polymerization takes place.

The process according to the invention is preferably carried out in a hydraulically filled reactor in the temperature range from 50° to 230° C., in particular at from 50° to 180° C., under a pressure in the range from 0.1 bar to 100 bar, in particular from 0.5 to 75 bar, and with average holdup times of the monomers in the reaction masses of from 20 to 420 minutes, in particular from 45 to 300 minutes.

The viscosity of the reaction medium can be up to 750 Pas, preferably up to 500 Pas. The flow rate in the tubes of the tube bundle reactor can be in the range from 0.5 to 20 cm/s, preferably in the range from 2 to 15 cm/s. The recycle ratio, defined as quotient of the mass flow conveyed by the circulating pump and the mass flow of the feed, can be in the range from 5 to 125, preferably in the range from 10 to 100. Volatile constituents are removed down to 1% by weight, in particular to less than 0.5 % by weight, based on the polymer, from the discharge from the reactor (the amount discharged corresponds to the amount fed in because the reactor is hydraulically filled) by single stage or multistage evaporation. The removed volatile constituents can be returned after condensation thereof into the reactor.

BRIEF DESCRIPTION OF THE DRAWING

The drawing sets out a diagrammatic representation of an apparatus that is used for carrying out comparative tests.

The process according to the invention and the apparatus necessary therefor are described hereinafter by means of examples of preferred embodiments and of comparative tests.

Test arrangement

Figure 1:
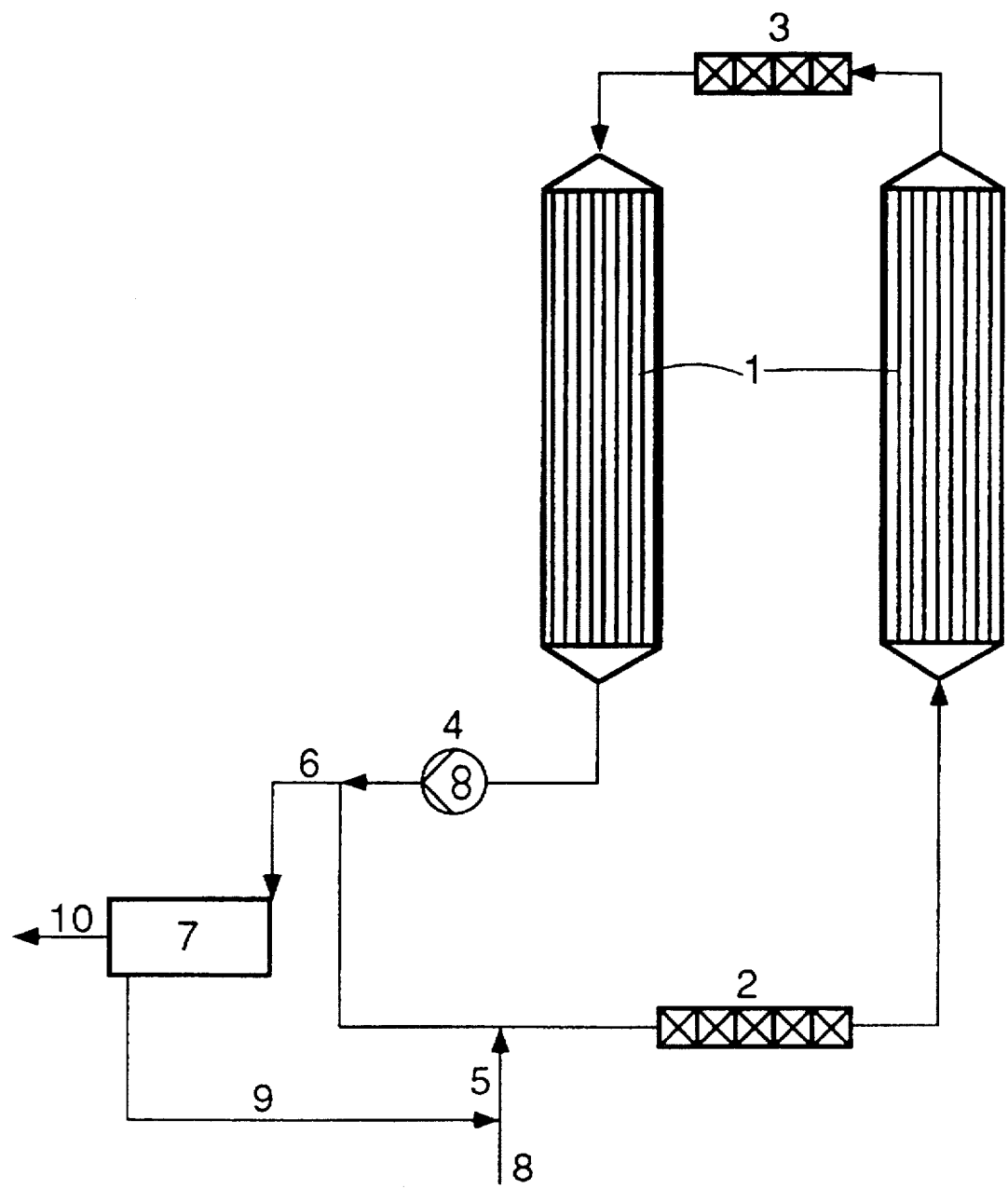

The tests were carried out in a recycle reactor whose design is depicted diagrammatically in the FIGURE. It consists of 2 tube bundle reactors each with 19 tubes 1 which have an internal diameter of 30 mm and a length of 300 cm. Liquid heat-transfer medium flows round them. Also belonging to the reactor are 2 static SMX mixers 2 and 3 from Sulzer. The mixing elements of these SMX mixers consist of a framework of intermeshing, mutually crossing arms. SMX mixers of this type are mainly used in the laminar flow region. A circulating pump 4, a feed mixture inlet 5, an outlet 6 and a degassing extruder 7 also belong to the reactor. The total volume of the reactor is 100 l. A mixture of fresh monomers 8 and volatile constituents 9 which have been recycled from the degassing and have been condensed is fed into the reactor. The discharged reaction mass is fed to the vaporizing extruder in which the volatile constituents are stripped off. The copolymer from the extruder is discharged in the form of extrudates and is cooled and granulated.

The nonuniformity was determined by gel permeation chromatography on the resulting granules. This nonuniformity is defined as Mw/Mn and is a measure of the breadth of the molecular weight distribution (see B. Vollmert, Grundriss Der Makromolekularen Chemie, vol. III, pages 130 et seq.). A polystyrene calibration plot was used as standard.

| Test conditions for the gel permeation chromatography: | |
|---|---|
| Name of column: | PL Gel 10 μm MIXED-B |
| Company: | Polymer Laboratories |
| Number: | 5 |
| Length + diameter: | 300 × 7.5 mm |
| Particle size: | 8–10 μm |
| Pore size: | 50–10$^6$ Å (mixed) |
| Material: | PS/DVB |
| Column temperature: | 35° C. |
| Flow rate: | 1.2 ml/min |
| Detectors: | RI410 (WATERS) |
| | UV spectra 100 at 254 nm (TSP Darmstadt) |

EXAMPLE 1

In the stationary state, a mixture of fresh monomers and of the condensed volatile constituents from the degassing extruder, from which unwanted constituents had been removed where appropriate, was fed to the polymerization system. The composition of the monomer feed pumped into the reactor was chosen so that the copolymer contained 35% by weight acrylonitrile and 65% by weight styrene. The ethylbenzene content, based on the total reaction mass in the reactor, was 15% by weight. The recycle ratio was 45, the average holdup time was 2.5 hours and the reaction temperature was 145° C. A 55% conversion was achieved. The nonuniformity was 2.2.

EXAMPLE 2

As Example 1 but the reaction temperature was 155° C. A conversion of 64% and a nonuniformity of 2.2 were obtained.

EXAMPLE 3

As Example 1 but the reaction temperature was 165° C. A conversion of 71% and a nonuniformity of 2.3 were obtained.

EXAMPLE 4

As Example 1 but the reaction temperature was 170° C. and the average holdup time was 2.3 hours. A conversion of 81% and a nonuniformity of 2.3 were obtained.

EXAMPLE 5

As Example 4 but the average holdup time was set at 2.7 hours. A conversion of 85% and a nonuniformity of 2.3 were obtained.

EXAMPLE 6

As Example 1 but the reaction temperature was 170° C. and the average holdup time was 2.2 hours and the proportion of ethylbenzene was 12%. A conversion of 82% and a nonuniformity of 2.3 were obtained.

COMPARATIVE EXAMPLES

The comparative examples were carried out in a stirred vessel with evaporative cooling. The total volume of the reactor was 100 l in this case too.

COMPARATIVE EXAMPLE 1

The test conditions corresponded to those described in Example 1. The resulting conversion was 52% and the nonuniformity was 2.3.

COMPARATIVE EXAMPLE 2

The test conditions corresponded to those described in Example 2. The resulting conversion was 63% and the nonuniformity was 2.7.

COMPARATIVE EXAMPLE 3

The test conditions corresponded to those described in Example 3. The resulting conversion was 69% and the nonuniformity was 2.9.

COMPARATIVE EXAMPLE 4

Test conditions corresponding to Example 4 led to a reaction mass which could not be discharged from the reactor because of its viscosity.

COMPARATIVE EXAMPLE 5

Test conditions corresponding to Example 6 led to a reaction mass which could not be discharged from the reactor because of its viscosity.

We claim:

1. A process for the continuous preparation of polymers from reaction components by bulk or solution polymerization, wherein the reaction components are passed through a recycle reactor which has at least one tube bundle reactor whose tubes are in thermal contact with a liquid heat-transfer medium and which is connected to at least one static mixing element.

2. The process of claim 1, wherein the reaction components are passed through the interior of the tubes of the tube bundle reactor, around which the heat-transfer medium flows.

3. The process of claim 1, wherein mixtures of at least one vinylaromatic monomer and at least one monomer from the group consisting of nitriles of (meth)acrylic acid and of esters of (meth)acrylic acid with alcohols with 1 to 8 carbon atoms, and maleic anhydride, are fed to the recycle reactor.

4. The process of claim 3, wherein styrene, α-methylstyrene and/or para-methylstyrene are used as vinylaromatic monomers.

5. The process of claim 1, wherein the solvents used in the solution polymerization are aromatic hydrocarbons with 6 to 12 carbon atoms.

6. The process of claim 5, wherein additionally solvents in a proportion of from 1 to 25% by weight and up to 5% by weight of water are fed in based on 100% by weight of the monomer mixture.

7. The process of claim 1, wherein the conversions in the polymerization are above 60%.

8. The process of claim 1, wherein the reaction temperature in the reactor is in the range from 50° to 230° C. and the pressure is in the range from 0.1 to 100 bar.

9. The process of claim 1, wherein the average holdup time of the monomers in the reaction mass is from 20 to 420 minutes.

10. The process of claim 1, wherein the flow rate of the reaction medium in the tube bundle reactor is in the range from 0.5 to 20 cm/s.

11. The process of claim 1, wherein the viscosity of the reaction medium does not exceed 750 Pas.

12. The process of claim 1, wherein the mass ratio of the mass stream which is circulated to the mass stream of the feed is in the range from 5 to 125.

13. The process of claim 1, wherein the value of the non-uniformity of the polymers is less than 2.7.

14. The process of claim 1, wherein mixtures of at least one vinylaromatic monomer and at least one monomer from the group consisting of nitriles of (meth)acrylic acid and of esters of (meth)acrylic acid with alcohols with 1 to 8 carbon atoms, and maleic anhydride, are fed to the recycle reactor wherein the solvents used in the solution polymerization are aromatic hydrocarbons with 6 to 12 carbon atoms and wherein additionally solvents in a proportion of from 1 to 25% by weight and up to 5% by weight of water are fed in based on 100% by weight of the monomer mixture.

15. The process of claim 1, wherein the solvents used in the solution polymerization are benzene, toluene, ethyltoluene or ethylbenzene.

16. The process for the continuous preparation of copolymers of styrene and acrylonitrile by bulk or solution polymerization, wherein the reaction components are passed through a recycle reactor which has at least one tube bundle reactor whose tubes are in thermal contact with a liquid heat-transfer medium and which is connected to at least one static mixing element, the reaction components being passed through the interior of the tubes of the tube bundle reactor, around which the heat-transfer medium flows, wherein styrene, α-methylstyrene and/or paramethylstyrene and at least one monomer from the group consisting of nitriles of (meth)acrylic acid and of esters of (meth)acrylic acid with alcohols of 1 to 8 carbon atoms and maleic anhydride are fed to the recycle reactor, wherein additional solvents in a proportion of from 2 to 18% by weight and up to 5% by weight of water are fed in based on 100% by weight of the monomer mixture, wherein the reaction temperature in the reactor is in the range of from 50 to 180° C. and the pressure is in the range of from 0.5 to 75 bar, wherein the average holdup time of the monomers in the reaction mass is from 45 to 300 minutes, wherein the flow rate of the reaction medium in the tube bundle reactor is in the range of from 2 to 15 cm/s, wherein the viscosity of the reaction medium does not exceed 500 Pas, wherein the mass ratio of the mass stream which is circulated to the mass stream of the feed is in the range of from 10 to 100 and wherein the value of the non-uniformity of the polymers is less than 2.5.

* * * * *